(12) United States Patent
Lantz (10) Patent No.: US 12,492,064 B2
(45) Date of Patent: Dec. 9, 2025

(54) INSULATED PACKAGING FOR USE WITH DRY ICE

(71) Applicant: Gary W. Lantz, San Juan Capistrano, CA (US)

(72) Inventor: Gary W. Lantz, San Juan Capistrano, CA (US)

( * ) Notice: Subject to any disclaimer, the term of this patent is extended or adjusted under 35 U.S.C. 154(b) by 0 days.

(21) Appl. No.: 18/511,898

(22) Filed: Nov. 16, 2023

(65) Prior Publication Data

US 2024/0166422 A1 May 23, 2024

Related U.S. Application Data

(63) Continuation-in-part of application No. 17/992,788, filed on Nov. 22, 2022, now Pat. No. 11,820,579.

(51) Int. Cl.

| | | |
|---|---|---|
| *B65D 81/38* | (2006.01) | |
| *B32B 27/10* | (2006.01) | |
| *B32B 27/36* | (2006.01) | |
| *B65D 27/00* | (2006.01) | |
| *B65D 65/40* | (2006.01) | |
| *B65D 65/46* | (2006.01) | |
| *B65D 77/04* | (2006.01) | |
| *F25D 3/12* | (2006.01) | |

(52) U.S. Cl.
CPC .......... *B65D 81/3825* (2013.01); *B32B 27/10* (2013.01); *B32B 27/36* (2013.01); *B65D 27/00* (2013.01); *B65D 65/40* (2013.01); *B65D 65/466* (2013.01); *B65D 77/0413* (2013.01); *F25D 3/125* (2013.01); *B32B 2307/304* (2013.01); *B32B 2307/7163* (2013.01); *B32B 2439/62* (2013.01)

(58) Field of Classification Search
CPC . F25D 3/06; F25D 3/105; F25D 3/125; B65D 81/3876; B65D 81/03; B65D 81/027; B65D 9/26; B65D 81/18–22; B65D 81/3823; B65D 25/16
See application file for complete search history.

(56) References Cited

U.S. PATENT DOCUMENTS

| | | | | |
|---|---|---|---|---|
| 8,763,886 | B2 * | 7/2014 | Hall | B65D 5/0227 |
| | | | | 220/592.25 |
| 9,751,682 | B2 * | 9/2017 | Mayer | B65D 81/3813 |
| 9,751,683 | B1 * | 9/2017 | Jobe | B65D 81/3813 |
| 9,957,098 | B2 * | 5/2018 | Jobe | B65D 81/3862 |
| 9,981,797 | B2 * | 5/2018 | Aksan | B65D 81/3816 |
| 10,357,936 | B1 * | 7/2019 | Vincent | B32B 27/10 |
| 10,442,600 | B2 * | 10/2019 | Waltermire | B31B 70/26 |
| 10,507,968 | B2 * | 12/2019 | Sollie | B65D 81/3858 |
| 10,551,110 | B2 * | 2/2020 | Waltermire | F25D 23/069 |
| 10,597,219 | B2 * | 3/2020 | Jobe | B65D 81/3823 |
| 10,800,595 | B2 * | 10/2020 | Waltermire | B65D 81/3813 |
| 10,800,596 | B1 * | 10/2020 | Vincent | B32B 29/007 |
| 11,059,651 | B2 * | 7/2021 | Knight | B65D 81/3816 |
| 11,059,652 | B2 * | 7/2021 | Sollie | B65D 81/3848 |
| 2004/0050740 | A1 * | 3/2004 | Lewis | G01N 21/78 |
| | | | | 206/459.1 |

(Continued)

*Primary Examiner* — Kareen K Thomas
(74) *Attorney, Agent, or Firm* — Crockett & Crockett, PC; K. David Crockett, Esq.

(57) ABSTRACT

A shipping container with an enclosure of insulating panels. The insulating panels include multiple layers of single faced cardboard within a compostable casing. The container includes and outer container, inner container, and the insulating panels.

15 Claims, 8 Drawing Sheets

(56) References Cited

U.S. PATENT DOCUMENTS

| | | | |
|---|---|---|---|
| 2004/0079794 A1* | 4/2004 | Mayer | B65D 81/3862 229/103.11 |
| 2004/0231355 A1* | 11/2004 | Mayer | F25D 3/06 62/457.2 |
| 2007/0160801 A1* | 7/2007 | Johnstone | B01D 5/0066 428/98 |
| 2007/0173090 A1* | 7/2007 | Johnson | H01M 50/213 439/157 |
| 2010/0064698 A1* | 3/2010 | Schabron | F25D 3/08 62/62 |
| 2012/0305435 A1* | 12/2012 | Matta | F25D 3/06 206/521 |
| 2014/0021208 A1* | 1/2014 | Anti | A01N 1/148 220/592.25 |
| 2015/0259126 A1* | 9/2015 | Mcgoff | B23P 19/00 220/592.2 |
| 2017/0043937 A1* | 2/2017 | Lantz | B65D 81/09 |
| 2020/0270053 A1* | 8/2020 | Jobe | B65D 90/08 |

* cited by examiner

INSULATED PACKAGING FOR USE WITH DRY ICE

This application is a continuation-in-part of U.S. application Ser. No. 17/992,788, filed Nov. 22, 2022, which is pending. The entirety of U.S. application Ser. No. 17/992,788 is hereby incorporated by reference.

FIELD OF THE INVENTIONS

The inventions described below relate to the field of insulated shipping containers.

BACKGROUND OF THE INVENTIONS

Insulated shipping containers are described in Lantz, Insulated Shipping Container, and Method of Making, U.S. Pat. No. 8,763,811 (Jul. 1, 2014). These shipping containers comprise an outer corrugated cardboard box enclosing insulating panels conforming to the inner contours of the outer box, a coolant, such as packaged ice, gel packs, or loose or packaged dry ice, placed around the product to refrigerate the product during shipping. The insulating panels are made of polyethylene casings filled with cornstarch pellets, and are placed within the outer box so as to conform to the inner contours of the box and surround products and dry ice masses within the box.

SUMMARY

The devices and methods described below provide for improved, longer lasting cooling within a shipping or storage container of the type described in U.S. Pat. No. 8,763,811. The improved system uses a casing which comprises an outer sheet which is impermeable to carbon dioxide gas and an inner sheet which is permeable to carbon dioxide gas. Dry ice is placed within the shipping container, along with contents which require refrigeration, and the container is closed (sealed or somewhat sealed). After closure, and upon sublimation of the dry ice, some portion of gaseous carbon dioxide passes through the permeable sheet of the casing and some may leak from the container. Because some portion of the sublimated gas enters the casing, it is retained and slowed in its eventual escape from the container, thereby maintaining low temperatures within the container longer than a system with an impermeable casing.

The insulated panels may be formed by filling the casing with small pellets or foamed particulate, and the casing may be subjected to suction to remove air from the casing, thereby drawing the casing tightly upon the pellets and locking them in place to form a stable configuration suitable for handling without losing their shape. For cubic or cuboid (a box with six rectangular faces) or triangular boxes (a box with three rectangular faces and two triangular faces) or other rectilinear box, the panels may be formed with creases so that the panels fold easily to fit into and conform to the inside of the box. Linear indentations, creases or furrows in the panel, facilitating folding of the panel may be formed by pressing a form onto the casing as it is filled with pellets, without heat sealing opposing inside and outside sheets of the panel.

DETAILED DESCRIPTION OF THE INVENTIONS

The shipping/storage container system includes an insulating enclosure/envelope comprising an insulating mass encased in a casing, where the casing comprises an outer sheet which has low $CO_2$ gas permeability and an inner sheet that has high $CO_2$ gas permeability. To keep contents cold during shipping or storage, dry ice (solid $CO_2$) is placed, along with contents, inside the insulating enclosure. The insulating enclosure may be sealed, or it may be disposed within an outer enclosure/envelope which may be sealed, to secure contents and dry ice within the insulating enclosure. When assembled, the insulating enclosure becomes distended as $CO_2$ gas permeates through the inner sheet but is trapped within the panels by the relatively impermeable outer sheet, such that edges of adjoining components of the insulating enclosure are distended to come into sealing contact.

Figure 1:
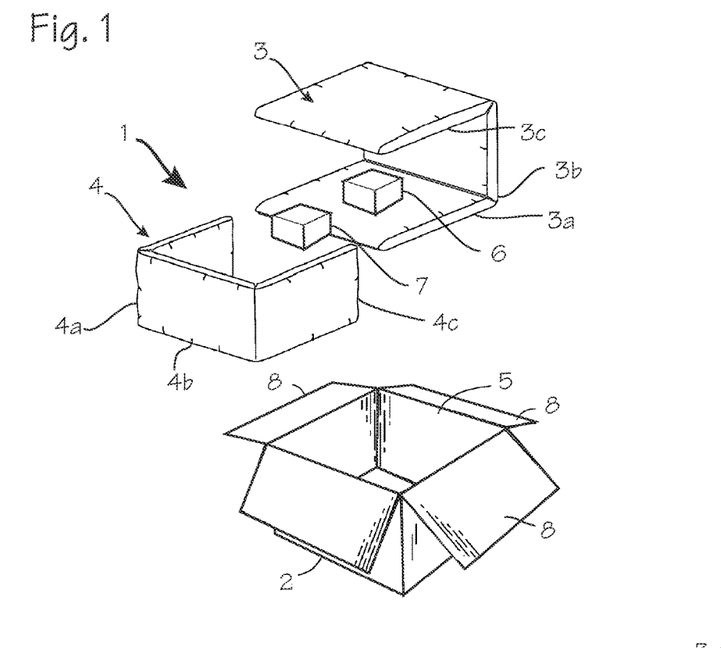
FIG. 1 illustrates a shipping container system with insulating panels comprising insulating mass disposed within a partially gas permeable casing.
Figure 13:
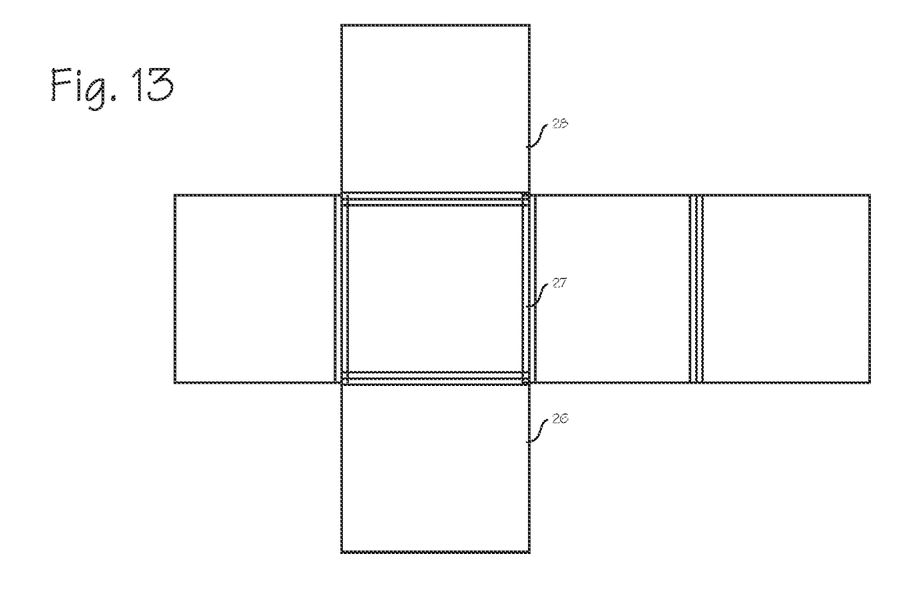
FIG. 13 illustrates an insulating panel assembly in the form of a single panel with six panels in a cross-shaped arrangement configured for folding into a cuboid shape and insertion into a cuboid outer box.

FIG. 1 illustrates a shipping container system 1 comprising an outer container or outer envelope 2 with an insulating enclosure/envelope comprising insulating panel assemblies 3 and 4 disposed about the interior surfaces 5 of the outer container/outer envelope. In this embodiment, the outer container/outer envelope is a cuboid box (typically cardboard), with six rectangular sides. The insulating panel assemblies 3 and 4 are configured in this embodiment into U-shaped forms, with one panel assembly configured to engage the other panel to form a cuboid insulating enclosure/envelope conforming to the inside of the box. Each panel assembly in this embodiment comprises three panels 3a, 3b, 3c or 4a, 4b and 4c, but panel assemblies for other embodiments may comprise any number of panels, including a single panel, or two panels (FIG. 6) or six panels (FIG. 13). The shipping system, in use, will include a mass of dry ice 6, which may be a single block or a mass of small dry ice pellets. The shipping system is intended for shipping of any content 7, and provides for cooling of the contents during shipping, when the box is closed and the flaps 8 are sealed. The panels and panel assemblies may be sized such that they are compressed upon closing of the box.

Figure 2A:
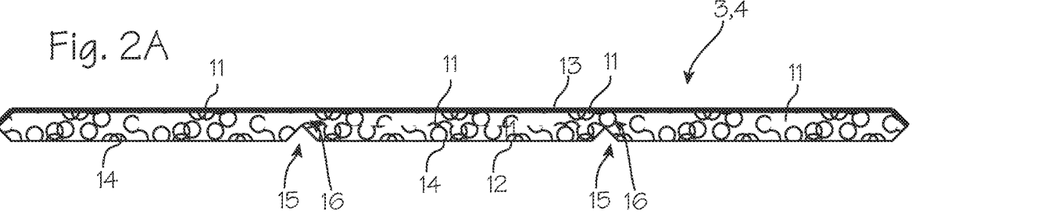
FIGS. 2A and 2B illustrate the insulating panel assemblies of FIG. 1.

FIG. 2A illustrates the insulating panel assemblies 3 and 4 of FIG. 1 which make up the insulating enclosure. The insulating panel assemblies (which include the panels 3a, 3b, 3c or 4a, 4b and 4c) comprise insulating materials preferably in the form of insulating pellets 11 disposed within a casing 12. The insulating material may instead comprise larger blocks of insulating material, with height and width almost as large as the box sides or panels segments. Thus, each panel assembly 3 and 4 comprises numerous pellets or monolithic blocks disposed in the casing, between a first/outer sheet 13 of the casing which is relatively impermeable to carbon dioxide gas and a second/inner sheet 14 of the casing which is relatively permeable to carbon dioxide. (Relatively impermeable means less permeable than the inner sheet, and relatively permeable means more permeable than the outer sheet.)

For uses in a cuboid box, the panel preferably includes one or more creases or furrows 15 which accommodate folding of the panel to fit within the box so that the panel easily conforms to the inside contour of the box, as shown in the configuration of insulating panels 3 and 4 shown in FIG. 1. For the cuboid box with right angle corners, the grooves can form an angle of about 90° or more; for triangular prism boxes the grooves can form an angle of about 120° or more, or, more generally, the grooves should comprise angles corresponding to the inside angles of the rectilinear contour of the inside of the box. The creases or furrows may extend through the entire thickness of the panel, or may, as shown, extend only partially through the panel leaving a gap 16 between the deepest extent of the furrow and the first/outer sheet 13. (This gap will facilitate filling with pellets and evacuation of air in the method illustrated in FIG. 5.) For round cylindrical boxes (hat boxes, for example), which may be lined with a round tubular insulating enclosure capped with round disks, the furrows are unnecessary.

Figure 2B:
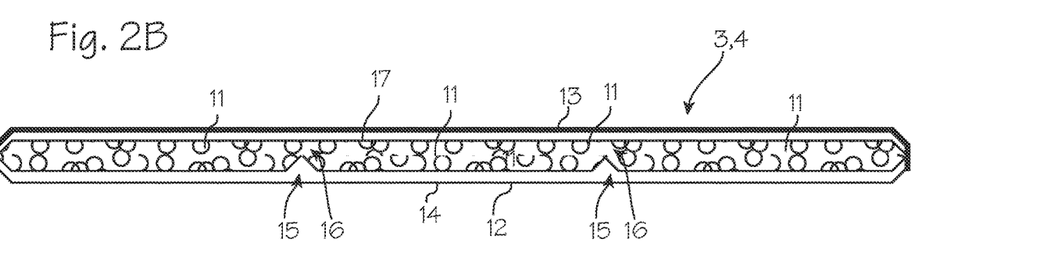

FIG. 2B illustrates a second embodiment of the insulating panels of FIG. 1. In FIG. 2B, the panel comprises the casing 12 with the first, outer sheet 13 and the second/inner sheet 14 of FIG. 2A, and also includes an inner casing 17 enclosing the pellets 11, and including the furrows 15. The inner casing 17 may comprise any sheet material suitable for encasing the pellets, and the entire inner casing may comprise the same film material.

The gas-impermeable first sheet and gas-permeable second sheet may be heat sealed together at outer edges. The sheets are preferably not heat sealed along the entire length of creases or furrows, and may be only partially sealed or entirely unsealed along the furrows so as to allow evacuation of air from the casing after filling with pellets and creation of the creases. Preferably, the outer casing 12 or the inner casing 17, or both, are subjected to vacuum and evacuated of air.

The first sheet need not be perfectly gas impermeable: the advantage of the system can be obtained so long as the first sheet is substantially impermeable and/or less permeable than the second sheet. Likewise, the second sheet need only be substantially permeable and/or more permeable than the first sheet. The advantages of the new structure can be achieved with an "impermeable" first/outer sheet 13 which is substantially less permeable than "permeable" second/inner sheet 14. A ratio of at least two to one (permeability of the inner sheet compared to the first sheet) may result in the desired passage of carbon dioxide into the panels through the more permeable second/inner sheet 13 and the desired inhibition of passage of carbon dioxide from the panel though the less permeable first/outer sheet 13, while higher ratios of 4 to 1 or more will result in longer retention of cooling gas and longer inflation of panel to cause the edge sealing described below.

Figure 3:
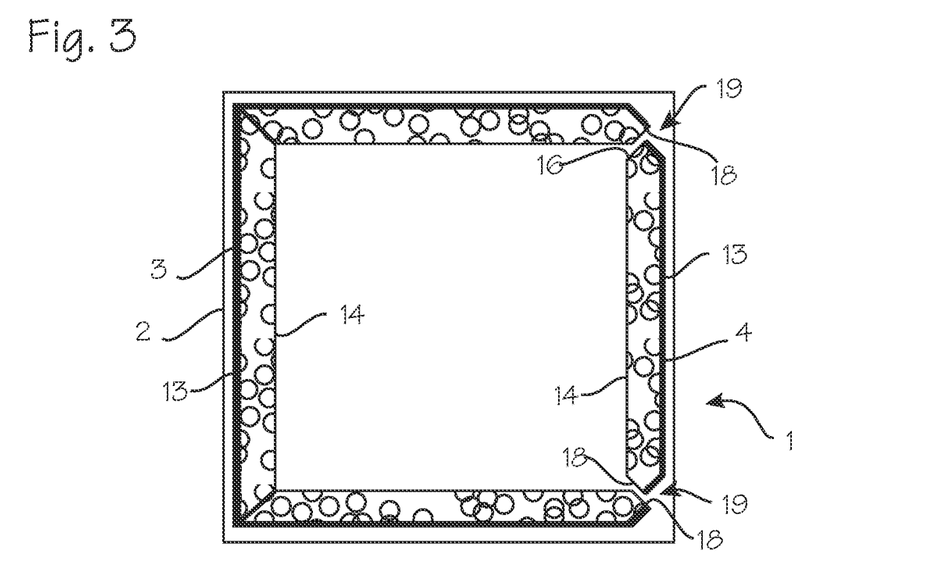
FIGS. 3 and 4 illustrate the operation of the insulating panels.
Figure 4:
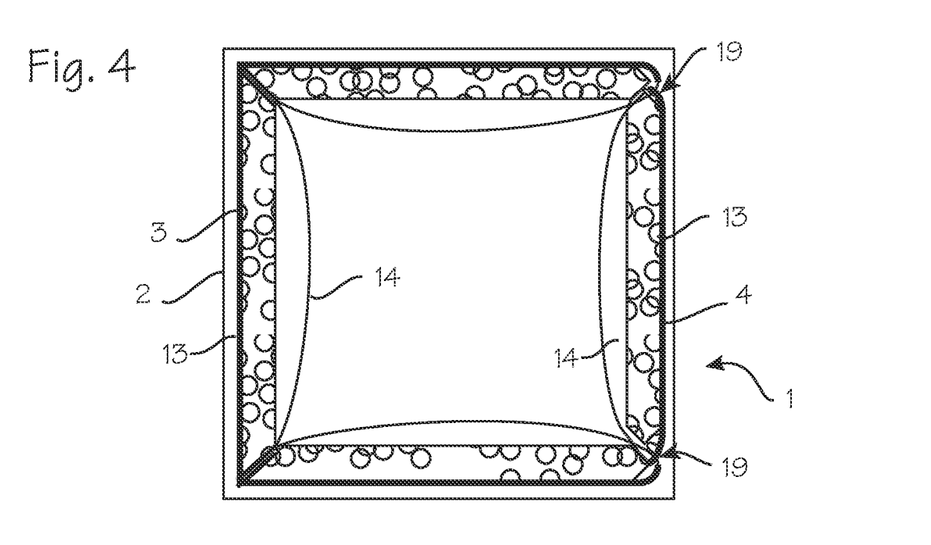

FIGS. 3 and 4 are cross sections of the system of FIG. 1 when assembled, and illustrate the operation of the insulating panels. In FIG. 3, the three panels of one panel assembly 3 and a single panel of the second panel assembly 4 are shown within the outer box 2. This depicts the system upon initial assembly, with the panels encapsulating the product and carbon dioxide mass, and the outer box encapsulating the panel assemblies and panels. The panels abut each other at the edges 18, leaving gaps 19 between loosely contacting surfaces along the edges of the panel segments. In this condition, carbon dioxide gas which sublimates from the solid carbon dioxide mass may leak through the gap and escape through the material of the outer box (typically, and preferably, cardboard). Continued leakage of the cool carbon dioxide gas reduces the length of the cooling provided by the gas, and reduces the length of time that adequate cooling is provided by the gas. FIG. 4 shows the condition of the system after some sublimation of carbon dioxide from the carbon dioxide mass. The gaseous carbon dioxide permeates through the "permeable" (or relatively more permeable) second/inner sheet 14, but does cannot permeate as quickly through the "impermeable" (or relatively less permeable) first/outer sheet 13, and so builds up within the panel. The buildup of carbon dioxide gas results in bloating and distension of the panels, so that the edges swell to close the gaps 19. This reduces edge leakage, which is the term used to refer to leakage of carbon dioxide gas from the interior of the insulating enclosure formed by the panels through gaps between abutting edges of the various panels used to create the insulating enclosure. The mass of pellets maintains its shape either because it is constrained by the inner casing 17 shown in FIG. 2B or because the pellets have been compressed into a stable configuration. The insulating material may also be a monolithic mass, comprised of a material that is sufficiently rigid to maintain its shape even when unconstrained by the casing (s).

The differential in permeability may be achieved using different material for the first/outer sheet and second/inner sheet, or by making the sheets of the same material with different thickness. For example, PLA biopolymer may be used for both the inner sheet, at 1.5 mil, and the same PLA biopolymer may be used for the outer sheet, at 4 mil, to achieve suitable entrapment, entrapping about 3 times as much gas in the panel compared to a panel in which both the inner sheet and outer sheet are 1.5 mil thick. The panels are sized and dimensioned to provide some degree of sealing between the two panels when configured and fixed in a shape of the enclosure (cuboid, triangular prism, closed-end cylinder, or other shape) and constrained, so that the pressure build-up within the enclosure can force $CO_2$ through the inner sheet (s) allowing the outer sheet (s) to entrap the gas, permitting the use of the same material for both the inner sheet (s) and the outer sheet (s).

If different materials are used, in comparable thickness (if different thickness) but divergent gas transmission rates, suitable materials for low permeability sheet may include PLA (polylactic acid) bioplastic (Ecovia™), polyvinylidene dichloride (Saran™), polyethylene terephthalate (soda bottle plastic), metalized polymer film (potato chip packaging for example) and aluminum foil (with essentially zero transmission). Suitable materials for the high permeability sheet may include PLA (polylactic acid) bioplastic (Ecovia™), low density polyethylene (six-pack rings), high density polyethylene (milk jugs), polystyrene (plastic produce bags), and microperforated polypropylene. Preferably, the material used for the sheets is compostable or biodegradable.

As a rough guide, sheets with a carbon dioxide transmission rate of 50 cc/m2/day or less may be used for the first/outer sheet 13, and sheets with a carbon dioxide transmission rate of 150 cc/m2/day or more may be used for the second/inner sheet 14, though the gas transmission rates may lay outside these ranges while still providing the differential permeance that leads to the desired distension and edge sealing that prolongs cooling performance of the system. For typical shipping of medical supplies and food assuming ambient temperature of 30° C. (86° F.), an outer sheet of metalized polymer film combined with an inner sheet of 1.5 mil polystyrene film in a 12"×12"×12" (30.5 cm×30.5 cm×30.5 cm) shipping carton with a 7"×4"×3" (17.8 cm×10.2 cm×7.6 cm) product box conditioned at −20° ° C. (−4° F.) topped with 5 kilograms of dry ice will provide several days maintained below 0° C. (32° F.). Oxygen transmission rates or other gas transmission rates may be used as a proxy for carbon dioxide transmission rates (carbon dioxide transmission rate are about 3 to 5 times the oxygen transmission rate), so that materials with relatively high gaseous oxygen (or other gas) transmissions rates can be used for second/inner sheet 14, materials with relatively low gaseous oxygen (or other gas) transmissions rates can be used for first/outer sheet 13.

The pellets, illustrated in the figures, may be small cylinders, spheres or spheroids, about 10 mm in diameter. The pellets, depending on their porosity and conductivity, can restrict the flow of $CO_2$ gas, in addition to the restriction provided by the first/outer sheet. The pellets may be made of compressible insulating material, such as styrofoam (expanded polystyrene), or starch, PLA (polylactic acid) or other biodegradable or compostable organic polymer or other natural polymer, or other biodegradable or compostable material. The pellets are shaped such that, coupled with the vacuum within the panels, they reduce heat conduction through the panels into the product chamber. The size of the casing depends on the size of the box with which it is to be used. The casing may be made in two layers, with a first casing immediately surrounding the pellets comprising two impermeable or permeable sheets (or even perforated sheets) and a second casing over the first casing, where the second casing comprises the outer, impermeable sheet and the inner, permeable sheet. The thickness of the panels can be chosen depending on the desired amount of insulation, the insulative effectiveness of the panel materials, and the permeability of the sheets.

The outer container/outer envelope may serve as a structural component of the system, protecting the insulating enclosure/envelope and panel assemblies during shipping. The outer container/outer envelope may be omitted in embodiments in which the first/outer sheet of the insulating enclosure comprises a material that is rigid and sufficiently robust for the intended use. For example, if the first/outer sheet of the insulating enclosure/envelope comprises polyethylene terephthalate or aluminum sheets that are thick enough to be self-supporting, an additional cardboard box surrounding the insulating enclosure may not be necessary, and the system can comprise the insulating enclosure without an additional enclosure surrounding the insulating enclosure. In this instance, the panel assemblies may be assembled and edges of adjacent panels may be sealed with tape.

Figure 5:
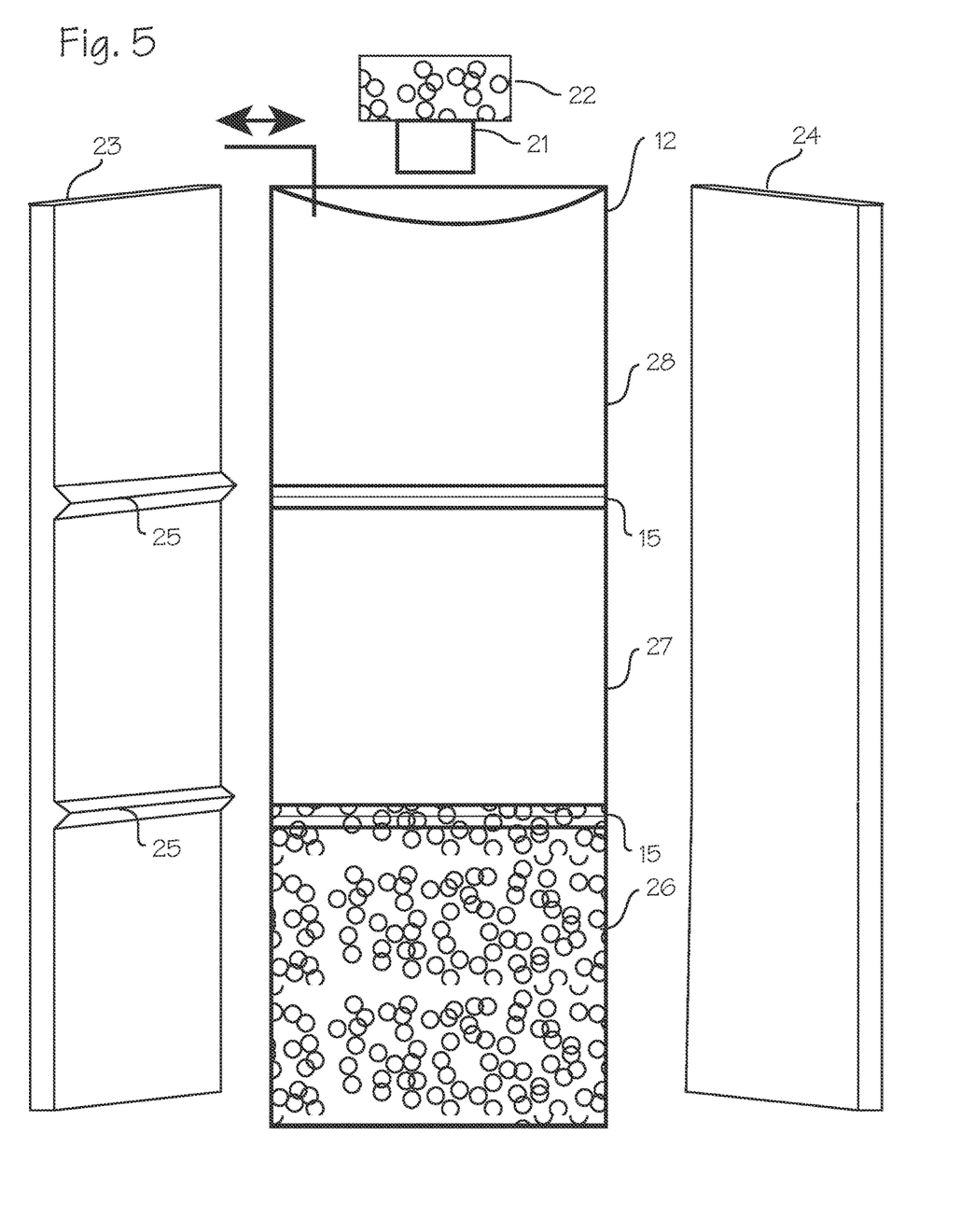
FIG. 5 illustrates a system and method for assembling the insulating panels of FIG. 1.

FIG. 5 illustrates a system for filling the casing with pellets, which is a convenient method of constructing the panel assemblies in the cuboid configuration. The casing 12, in the form of a bag with an open end and a closed end, is hung vertically with the open end up, and inflated, and then partially filled with pellets. A portion of the casing (a portion corresponding to a first box side) is filled with pellets from a chute 21 and bin 22. The casing is then pressed flat between press plates 23 and 24. One press plate 23 includes long bars 25, forming angles corresponding to the desired angle of the creases 15 (90° if the panel is to be used to line a cuboid box), such that the pressing step forms the desired crease or furrow 15 in the panel. The furrow need not extend the entire thickness of the panel, leaving a small gap (gap 16 in FIG. 2A) between the panel sheets along the length of the furrow. With the first portion 26 filled, the casing is pressed between the press plates, and vacuum is applied to the bag. This partially compresses the mass of pellets into interlocking relationship so that the mass may maintain a flat smooth configuration with the bag (which need only be robust enough to maintain its shape for the subsequent handling). The press is then opened, the bag may be inflated again, and a second portion (corresponding to a second box side) of the casing is filled with pellets. With the second portion 27 filled, the casing is again pressed between the press plates, and vacuum may be applied to the bag. This partially compresses the mass of pellets in the second portion into interlocking relationship. The process is repeated until the third (or last) portion 28 is filled and pressed, and the casing top is sealed. Alternatively, the entire panel assembly can be opened using compressed air inside a form, then filled with pellets, and pressed to smooth the panel surface, and thereafter evacuated and sealed.

To assemble a cuboid box, two panels, each with three segments, can be folded into C-shapes and fitted together into the cuboid configuration, or a single panel with six segments (in a cross configuration) may be folded into a cuboid shape and placed in the outer box. Dry ice and a product can be placed into the box, inside the folded panels, and the outer box may be taped up for shipping.

Once assembled, with the product and dry ice inside the panel assemblies inside the outer box, the dry ice will slowly sublimate into gaseous carbon dioxide. Some of the carbon dioxide will seep between the edges at which the panels meet and seep through the outer box and seams of the outer box. Some of the carbon dioxide will seep through the permeable inner sheet of the panels and enter the casing. This will result in retention of cold carbon dioxide gas within the outer box, which will provide longer-lasting cooling power. Entry of carbon dioxide gas into the panels will also result in swelling or distension of the panels, creating a tight (or, at least, improved) seal between adjoining edges of panels segments, thus further slowing seepage of cold carbon dioxide gas from the box and retaining cooling power.

Figure 6:
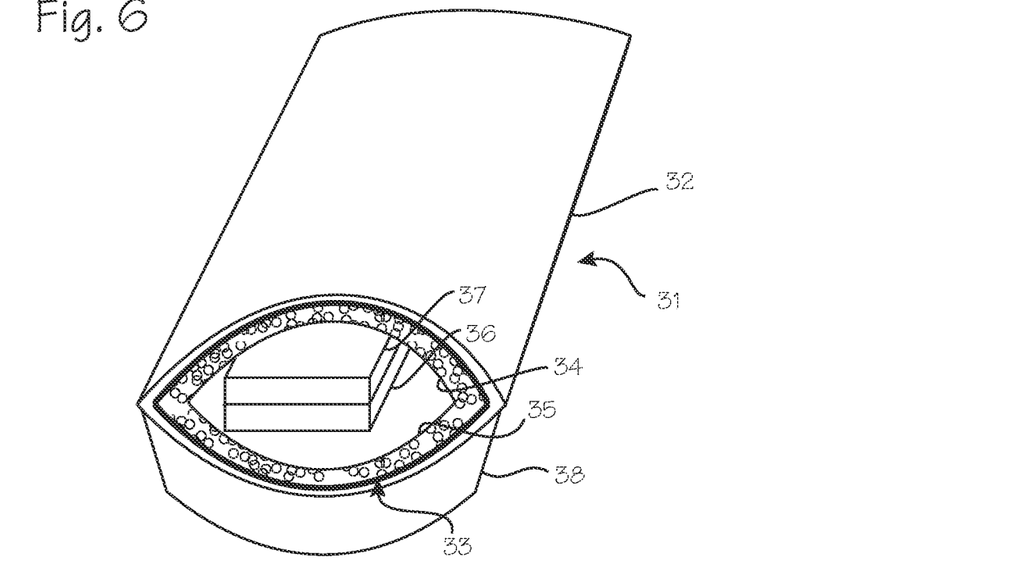
FIGS. 6, 7 and 8 illustrate an embodiment of the shipping container system in the form of a mailing envelope.
Figure 7:
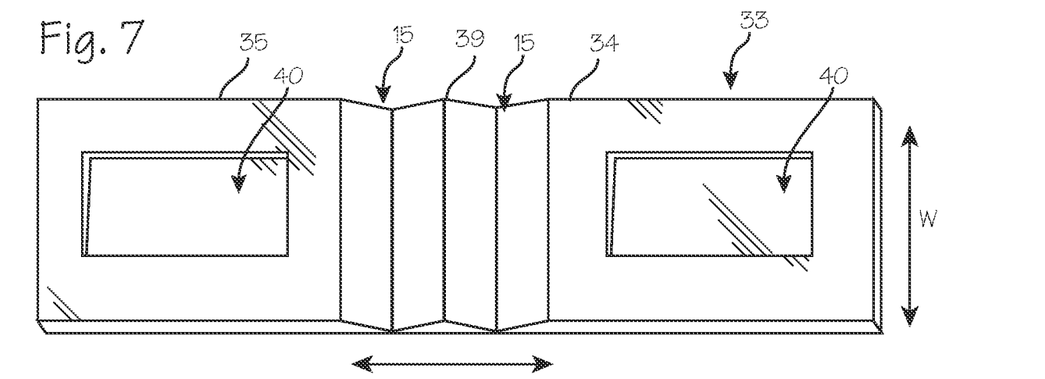
Figure 8:
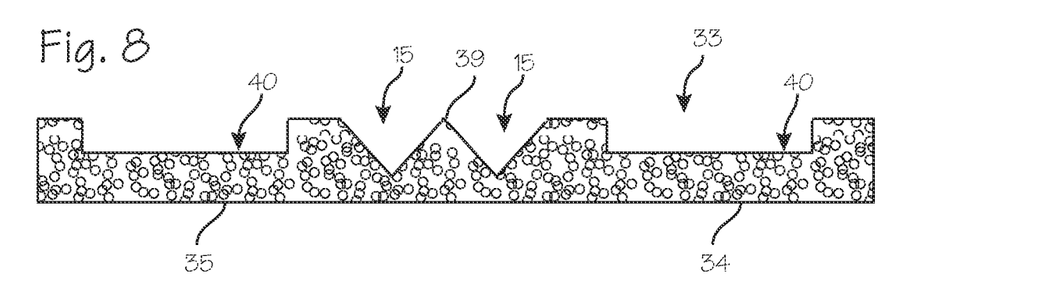

FIG. 6 illustrates the packaging system with an outer container in the form of a mailing envelope, in the form of a flat paper container with a sealable flap. In the Figure, the mailer 31 comprises an outer mailing envelope 32 enclosing an insulating envelope in the form of a panel assembly 33 comprising a pair of opposing panels 34 and 35 enclosing a mass of dry ice 36 and product 37. The outer mailing envelope may be a conventional paper, cardboard or spun bound polyethylene (TYVEK®) mailing envelope. The opposing panels may comprise flat panels sealed together at their edges, a single double walled tube (sealed at one or both ends), or a single panel with two segments separated by a furrow, folded and sealed (heat sealed, taped, or glued) at the edges, leaving an opening available for insertion of a carbon dioxide mass and product. Upon closing the mailing envelope by closing the flap 38, sublimated carbon dioxide gas will permeate the second/inner sheet 14, remain trapped by the first/outer sheet 13, and cause the panels to swell and bloat, improving the seal between the otherwise open end edges of the panels. FIGS. 7 and 8 illustrate a panel assembly 33 suitable for use in the mailer envelope of FIG. 6. This panel assembly 33 includes panels 34 and 35 and two furrows 15 separated by triangular ridge 39, all running across the width W of the panel assembly, transverse to the length L of the panel assembly. This construction allows folding of the panel assembly into a configuration in which the two panels oppose each other and the ridge obstructs the seam created by the folded assembly. One or both panels may be configured with recesses 40, configured to accommodate and/or constrain the dry ice 36 and product 37.

Figures 9, 10, 11, 12:
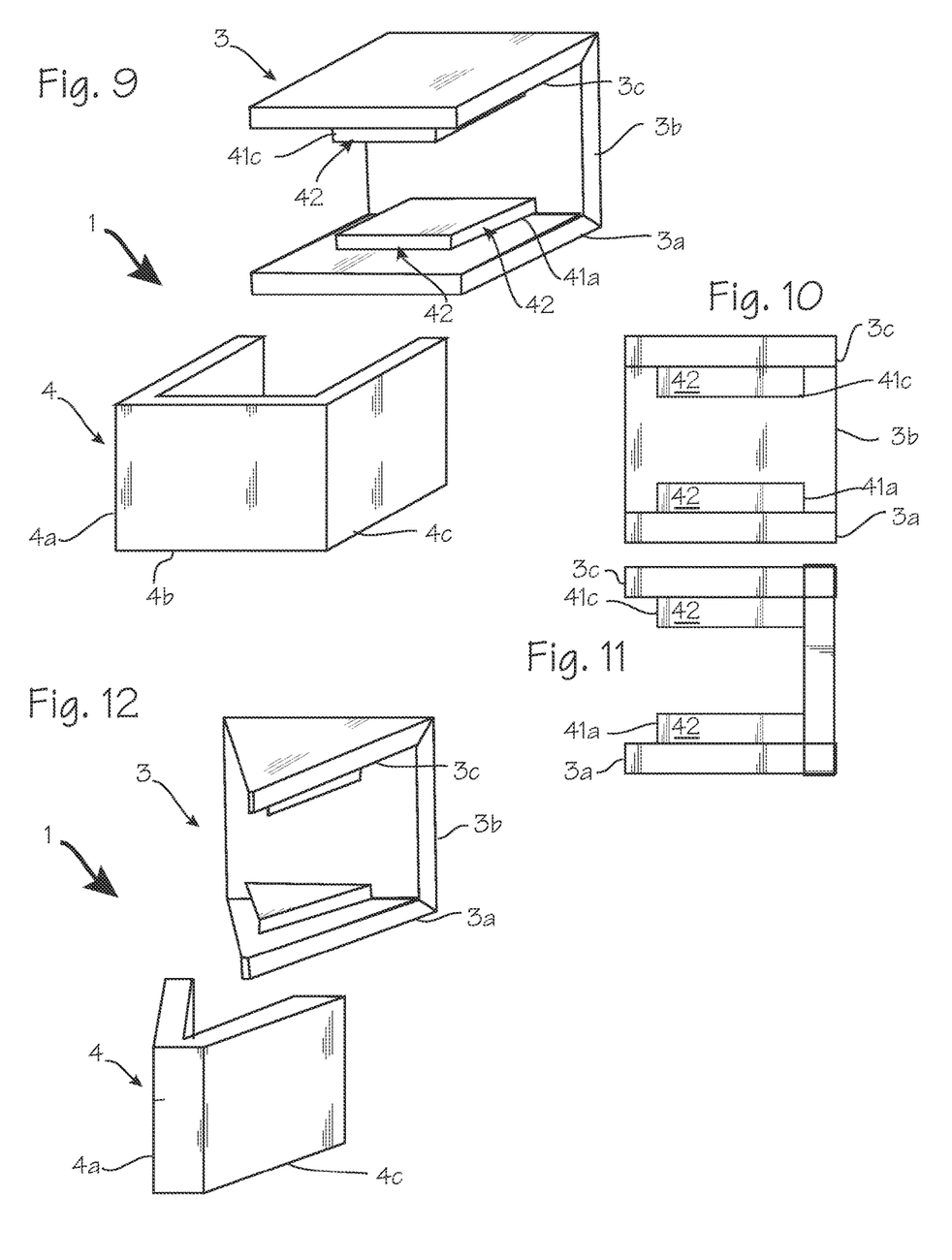
FIGS. 9, 10 and 11 illustrate an embodiment of the panel assemblies of FIG. 1, modified with the addition of interlocking features.
FIG. 12 illustrates triangular prism panel assemblies for use with triangular prism shipping containers.

FIGS. 9, 10 and 11 illustrate an embodiment of the panel assemblies of FIG. 1, modified with the addition of interlocking features. The interlocking panels improve insulation by improving edge loss protection, creating additional tortuous pathways to hinder escape of cooling gas from the assembled panel assembly. The panel assemblies 3 and 4 are configured as in FIG. 1, each with three panels 3a, 3b, 3c or 4a, 4b and 4c. One panel assembly, in this illustration panel assembly 3, includes supplemental panels 41a, 41c disposed within the panel assembly, on the inside surfaces of panels 3a and 3c. The supplemental panels are sized and dimensioned, and disposed on the inner surface, so that, when the second U-shaped panel assembly 4 is slipped into interlocking relationship with the first U-shaped panel assembly 3 with panel 4a disposed between panels 3a and 3c on one side of the enclosure, and panel 4c disposed between panels 3a and 3c on the second side of the enclose, the supplement panels 41a and 41c are disposed between panels 4a and 4c, and perimeter edge surfaces 42 abut the interior surfaces of panels 4a, 4b and 4c. The supplemental panels are sized and dimensioned such that, when distended or bloated with $CO_2$ gas, the perimeter edges impinge on the inner surfaces of panels 4a, 4b and 4c to create a seal which impedes passage of $CO_2$ gas past the joins of the supplemental panels and panels 4a, 4b and 4c. FIG. 10 is a view of the panel assembly 3, with three panels 3a, 3b, 3c and supplemental panels 41, viewed from the open end of the panel assembly, and FIG. 11 is a view of the same panel assembly viewed from the open side of the panel assembly.

The insulating enclosure can comprise panel assemblies comprising various panels which may be assembled into shapes corresponding outer enclosure/envelopes such as common shipping/storage boxes. Similar constructions may be made with panel assemblies in other geometric configurations (other than the cuboid of FIGS. 9, 10 and 11) such as triangular prism shipping containers (colloquially, triangle tubes), as illustrated in the panel assemblies of FIG. 12. This triangular prism enclosure corresponds to the cuboid enclosure of FIGS. 1 and 9, and includes panel assemblies 43 and 44, which are examples of one panel configuration that can be used to create the triangular prism insulating envelope. Panel assembly 43 includes rectangular panel 45 and two triangular panels 46 and 47, and, optionally, two triangular supplemental panels 48a and 48c. Panel assembly 44 includes two rectangular panels 4a and 4c which are joined and folded to create a V-shaped panel assembly which interlock with the panel assembly 43 to create an insulating enclosure in the form of a triangular prism which can be placed in a triangular prism shipping tube.

Figure 14:
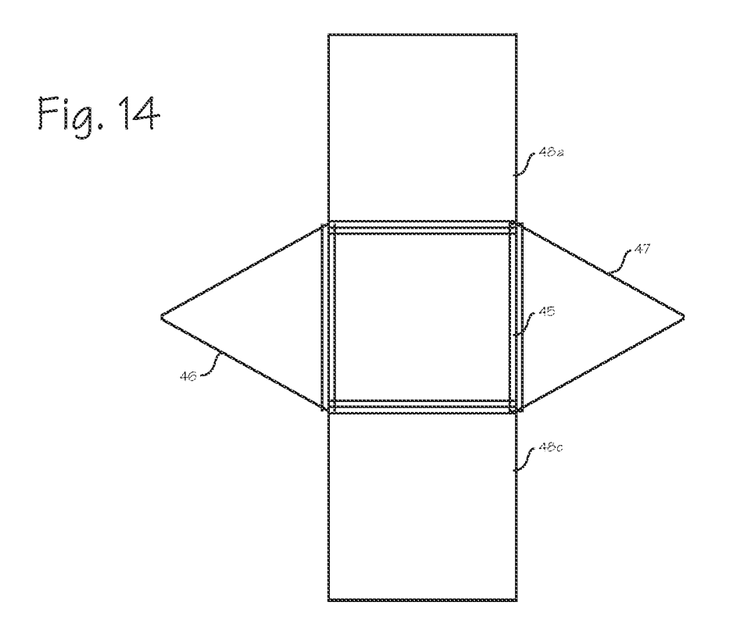
FIG. 14 illustrates an insulating panel assembly in the form of a single panel with five panels in a cross-shaped arrangement configured for folding into a triangular prism and insertion into a triangular prism box.

FIG. 13 illustrates an insulating enclosure in the form of a single panel with six segments in a cross-shaped arrangement configured for folding into a cuboid shape and insertion into a cuboid outer box. The panel may also be formed with the same configuration as the outer cardboard box, with four side panels, a pair of folding flap panels on top and a pair of folding flap panels on the bottom, to be assembled in the same manner as the outer cardboard box and inserted into the outer cardboard box. The panels may be formed in many configurations to match any container. As with the cuboid configuration, the triangular prism configuration may be formed from a single panel assembly, as shown in FIG. 14, with a rectangular panel 45 joined to two triangular panels 46 and 47 and two rectangular panels 4a and 4c. This single panel assembly may be folded to create the triangular prism insulating enclosure.

In each of the embodiments shown above, the panels can be formed with depressions in the interior surface (s) suitable to hold either a block of dry ice and/or the product securely in place.

Thus, as described above, the shipping container system comprises an outer enclosure, which may be any container (comprising, for example, a cardboard box or a mailing envelope or other container), an insulating enclosure characterized by an outer surface and an inner surface and a chamber within the enclosure, and a mass of carbon dioxide disposed within the enclosure. The insulating enclosure comprises a first sheet of material forming the outer surface and a second sheet of material comprising the inner surface of the enclosure, and an insulating mass (pellets or slabs) disposed between the first/outer sheet and the second sheet. The first/outer sheet comprises a material substantially impermeable to carbon dioxide gas and the second/inner sheet comprises a material which is substantially permeable to carbon dioxide gas (such that the first/outer sheet is less permeable to gas transmission than the second/inner sheet), so that, when assembled with the enclosure inside the box and the mass of carbon dioxide disposed within the enclosure, carbon dioxide gas sublimating from the mass of carbon dioxide permeates the second sheet to cause distension of the insulating enclosure.

Figure 15:
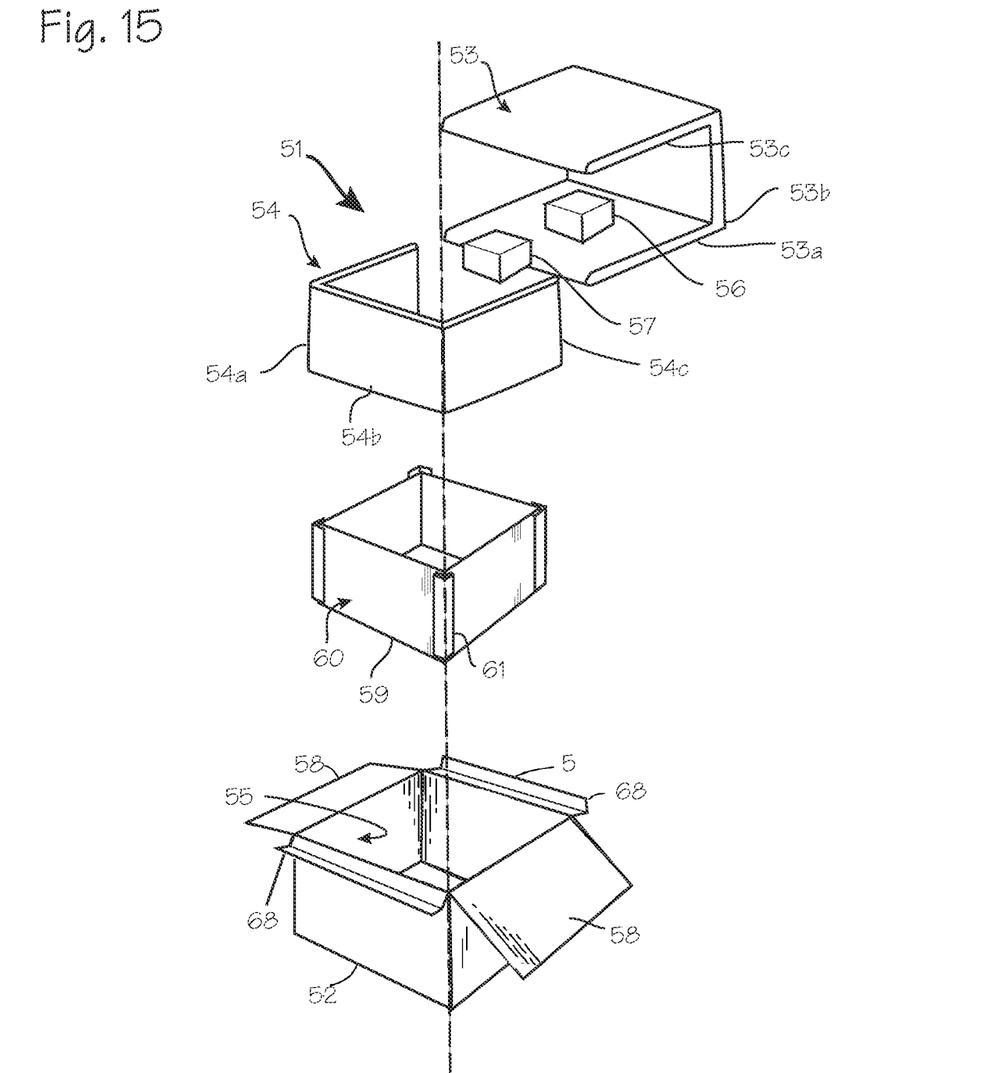
FIG. 15 illustrates a shipping container system with insulating panels comprising an alternative insulating mass disposed within a partially gas permeable casing.

FIG. 15 illustrates a shipping container system 51 with insulating panels comprising an alternative insulating mass and an alternative gas transmission boundary and insulating barrier disposed within an outer container. As in FIG. 1, the shipping container system 51 comprises an outer container or outer envelope 52 with an insulating enclosure/envelope comprising insulating panel assemblies 53 and 54 disposed about the interior surfaces 55 of the outer container/outer envelope. In this embodiment, the outer container/outer envelope is a cuboid box (typically cardboard), with six rectangular sides. The insulating panel assemblies 53 and 54 are configured in this embodiment into U-shaped (or C-shaped) forms, with one panel assembly configured to engage the other panel to form a cuboid insulating enclosure/envelope conforming to the inside of the box. Each panel assembly in this embodiment comprises three panels 53a, 53b, 53c or 54a, 54b and 54c, but panel assemblies for other embodiments may comprise any number of panels, including a single panel, or two panels (FIG. 6) or six panels (FIG. 13). The shipping system, in use, will include a mass of dry ice 56, which may be a single block or a mass of small dry ice pellets. The shipping system is intended for shipping of any content 57, and provides for cooling of the contents during shipping, when the box is closed and the flaps 58 are sealed. Thus, generally, the container system includes an outer container and an inner container sized and dimensioned to fit within the outer container, with an outer surface of the inner container spaced from the inner surface of the outer container. The insulating mass and first casing are disposed within the inner container and the insulating mass includes a plurality of layers of single faced cardboard panels. The insulating mass may consist of layers of single faced cardboard panels, without additional materials, or it may comprise layers of single faced cardboard panels with layers of additional materials which may, for example, impart mechanical strength, an additional gas transmission barrier, or other properties, to the insulating mass.

In addition to the features of the enclosure of FIG. 1, the enclosure of FIG. 15 includes an inner container or enclosure 59 disposed inside the outer box 52. This inner container comprises a thermally insulative material such as cardboard (preferably corrugated cardboard) with a outer surface 60. The container can include an entire six-sided cuboid box, or a four-sided rectangular enclosure (without a fifth or sixth side to complete a cuboid box) which is shown in the figure (or other box shape corresponding to the outer panels of other shapes shown in the previous figures).

Spacers 61 disposed on the outer surface of the inner container, between the inner container and the outer container, function to maintain an air gap between the inner container and the outer container for large areas of the surface of the inner container. The spacers are configured to maintain a gap, preferably devoid of material other than air or gas, between the inner container and the outer container. In FIG. 15, the spacers are cardboard "angle boards" or "corner boards" (terms that denote, to artisans in packaging, the structure shown; see U.S. Pub. 2015/0307230). Though angle boards are preferred for their corner protection, spacers can be disposed anywhere between the inner container and outer container.

Figure 16:
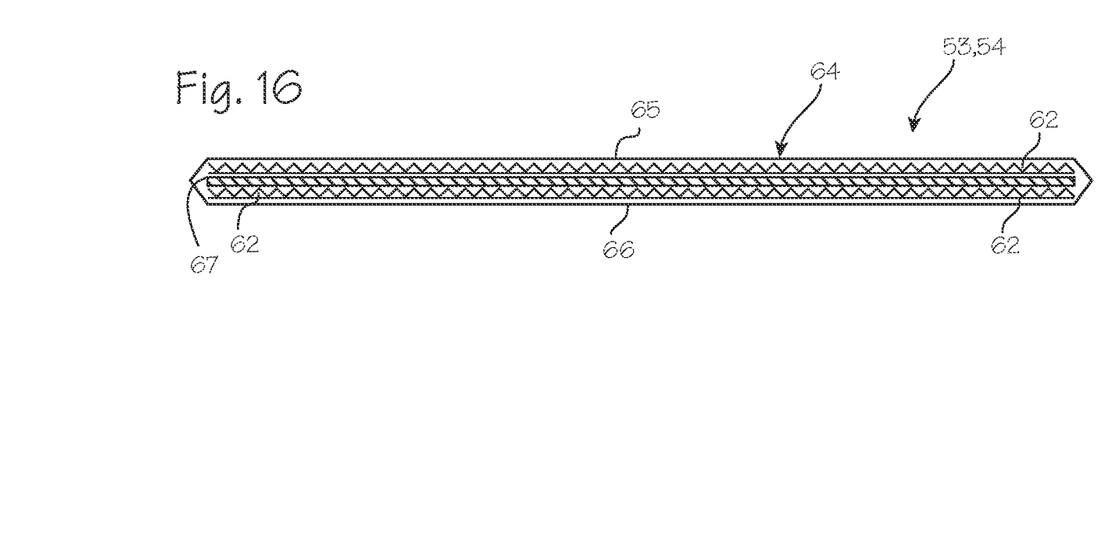
FIG. 16 illustrates the insulating panel assemblies of FIG. 1 which make up the insulating enclosure.

FIG. 16 illustrates the insulating panel assemblies 53 and 54 of FIG. 15 which make up the insulating enclosure. The insulating panel assemblies (which include the panels 53a, 53b, 53c or 54a, 54b and 54c) comprise an insulating mass preferably in the form of a plurality of single faced cardboard panels 62 disposed within a casing 63. Single faced cardboard is an industry term that refers to a cardboard panel with a single layer of corrugated medium with linerboard on only one side of the corrugated medium, which provides a flexible panel assembly that can readily be folded into the U-shaped (or C-shaped) panel assemblies illustrated. Other foldable insulating materials may be used. The corrugations of the single faced cardboard ((folds and furrows of the corrugated medium) are aligned parallel to the folds of the insulating panel assemblies 53 and 54, allowing multiple layers of cardboard in the insulating panel assemblies to be folded into the U-shapes shown.

For clarity of illustration, FIG. 16 is shown with two single faced corrugated cardboard panels, but more panels may be used as desired to achieve a desired level of thermal performance (for example, a container measuring 12"×12"×12", with 8 layers of single faced corrugated cardboard in the panel assemblies, with two 1.5 mil bags around the single faced corrugated cardboard, a product at a starting temperature of −20 F, 11 pounds of dry ice inside the container, and with ambient temperature in the range of 30-40° F., can maintain a temperature within the inner container below −20 F for about 42 hours). Each panel assembly 53 and 54 comprises the several single faced cardboard panels disposed within a casing 64. This casing 64 can consist of a compostable polymer, such as AnBio CTR02 (comprising biodegradable polymers PLA (polylactic acid) and PBAT (polybutylene adipate terephthalate)), for both the first, outer sheet 65 and the second/inner sheet 66. Alternatively, each panel assembly can include a casing comprising a first/outer sheet which is relatively impermeable to carbon dioxide gas and a second/inner sheet which is relatively permeable to carbon dioxide, as in FIG. 2A. An optional polymer sheet 67 may be included in the panel assemblies 53 and 54, sandwiched between two of the single faced corrugated panels, to provide some additional mechanical strength to the panel assemblies.

Also illustrated in FIG. 15, two of the box-top flaps 68 on opposite sides of the outer container are modified in this embodiment to be shorter that the other two flaps, and include a fold line, about which the flap may be folded to provide a short double layered flap, which can then be folded into the box, after which the remaining flaps can be folded over the short flaps and secured, thereby creating an air gap between the outer container flaps and the upper surface of the panel assembly (or inner container) which opposed the flaps.

The panels and panel assemblies of FIG. 15 may be compressible, and sized such that they are compressed upon closing of the box. That is, the unconstrained outer size of the assembled panel assemblies 53 and 54 may be slightly larger than the interior of the inner container, such that assembled panel assemblies 53 and 54, assembled into a shape corresponding to the interior of the inner container, has an exterior perimeter larger than an interior perimeter of the inner container, and the insulating enclosure is compressible to fit within the inner container.

While the preferred embodiments of the devices and methods have been described in reference to the environment in which they were developed, they are merely illustrative of the principles of the inventions. While primarily intended for use as a shipping container, the system can be used for temporary cold storage. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A container system comprising:
   an outer container;
   an inner container sized and dimensioned to fit within the outer container, with an outer surface of said inner container spaced from an inner surface of the outer container; and
   an insulating enclosure disposed within the inner container, said insulating enclosure comprising an insulating mass encased in a first casing, said insulating mass comprising of a plurality of layers of single faced cardboard panels, and said casing comprising a compostable polymer; wherein
   the outer container comprises a first cuboid box;
   the inner container comprises a four-sided rectangular enclosure, sized to fit within the outer container leaving a gap between the outside surfaces of the inner container and the inside surfaces of the first cuboid box;
   a plurality of spacers disposed between the inner container and the outer container, said spacers configures to maintain a gap, preferably devoid of material other than air or gas, between the inner container and the outer container.

2. The container system of claim 1, further comprising one or more angle boards disposed between the inner container and outer container.

3. The container system of claim 1 wherein:
the insulating enclosure comprises a pair of U-shaped insulating panels assembled together to form a cuboid shape conforming to an inner surface of the inner container.

4. The container system of claim 1 wherein:
the insulating enclosure comprises a single flat panel having a cross shape, configured to be folded into a cuboid shape conforming to an inner surface of the cuboid box.

5. The container system of claim 1 wherein:
the insulating enclosure comprises a pair of U-shaped insulating panels assembled together to form a cuboid shape conforming to an inner surface of the cuboid box.

6. The container system of claim 1 wherein:
the insulating enclosure comprises a single flat panel having a cross shape, configured to be folded into a cuboid shape conforming to an inner surface of the cuboid box.

7. A container system comprising:
an outer container;
an inner container sized and dimensioned to fit within the outer container, with an outer surface of said inner container spaced from an inner surface of the outer container; and
an insulating enclosure disposed within the inner container, said insulating enclosure comprising an insulating mass encased in a first casing, said insulating mass comprising of a plurality of layers of single faced cardboard panels, and said casing comprising a compostable polymer; wherein
the outer container comprises a first cuboid box;
the inner container comprises a second cuboid box, sized to fit within the outer container leaving a gap between the outside surfaces of the inner container and the inside surfaces of the first cuboid box;
a plurality of spacers disposed between the inner container and the outer container, said spacers configured to maintain a gap, preferably devoid of material other than air or gas, between the inner container and the outer container.

8. The container system of claim 7, further comprising one or more angle boards disposed between the inner container and outer container.

9. The container system of claim 7 wherein:
the insulating enclosure comprises a pair of U-shaped insulating panels assembled together to form a cuboid shape conforming to an inner surface of the inner container.

10. The container system of claim 7 wherein:
the insulating enclosure comprises a single flat panel having a cross shape, configured to be folded into a cuboid shape conforming to an inner surface of the cuboid box.

11. The container system of claim 7 wherein:
the insulating enclosure comprises a pair of U-shaped insulating panels assembled together to form a cuboid shape conforming to an inner surface of the cuboid box.

12. The container system of claim 7 wherein:
the insulating enclosure comprises a single flat panel having a cross shape, configured to be folded into a cuboid shape conforming to an inner surface of the cuboid box.

13. A container system comprising:
an outer container;
an inner container sized and dimensioned to fit within the outer container, with an outer surface of said inner container spaced from an inner surface of the outer container; and
an insulating enclosure disposed within the inner container, said insulating enclosure comprising an insulating mass encased in a first casing, said insulating mass comprising of a plurality of layers of single faced cardboard panels, and said casing comprising a compostable polymer; wherein
the outer container comprises a mailer envelope; and wherein
the insulating enclosure comprises a single flat panel, configured to be folded into a flat shape configured for insertion into the mailer envelope.

14. The container system of claim 13 wherein the panel is formed with a cavity configured to encompass a product or mass of dry ice to secure the product or mass of dry ice during shipping.

15. The container system of claim 13 wherein:
the insulating enclosure comprises a pair of flat panels, disposed with the mailer envelope in opposing relationship, with the carbon dioxide mass disposed between the panels.

* * * * *